United States Patent
Duffield et al.

(10) Patent No.: US 7,509,389 B1
(45) Date of Patent: *Mar. 24, 2009

(54) SYSTEM FOR PROVIDING TRANSPARENT PARTICIPATION OF THIRD PARTIES IN INSTANT MESSAGING COMMUNICATION

(75) Inventors: Dana M. Duffield, Rochester, MN (US); Matthew G. Kelm, Rochester, MN (US); Mark J. Luchini, Rochester, MN (US); Kevin W. Sutter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/112,871

(22) Filed: Apr. 30, 2008

Related U.S. Application Data

(63) Continuation of application No. 11/970,092, filed on Jan. 7, 2008, now Pat. No. 7,392,290.

(51) Int. Cl.
  *G06F 15/16* (2006.01)
  *G06F 12/00* (2006.01)
(52) U.S. Cl. .................... 709/209; 709/207
(58) Field of Classification Search ........... 709/206, 709/207, 227, 228, 229, 250
  See application file for complete search history.

(56) References Cited

U.S. PATENT DOCUMENTS

| 6,339,754 | B1 * | 1/2002 | Flanagan et al. ............... 704/2 |
| 6,496,851 | B1 * | 12/2002 | Morris et al. ............... 709/204 |
| 6,944,136 | B2 * | 9/2005 | Kim et al. ............... 370/260 |
| 6,988,126 | B2 * | 1/2006 | Wilcock et al. ............. 709/204 |
| 7,058,682 | B2 | 6/2006 | McGee et al. |
| 7,392,290 | B1 * | 6/2008 | Duffield et al. ............. 709/206 |
| 2003/0009523 | A1 | 1/2003 | Lindskog et al. |
| 2008/0071917 | A1 * | 3/2008 | Petrovykh ................... 709/230 |

\* cited by examiner

*Primary Examiner*—Zarni Maung
(74) *Attorney, Agent, or Firm*—Cantor Colburn LLP

(57) ABSTRACT

An instant messaging system for providing transparent participation of third parties in instant messaging, the system comprising: a first server and a second server configured to create a first chat session between a first chat party and a second chat party, communication in the first chat session being bidirectional between the first chat party and the second chat party, the first chat session being a sub-chat of a chat thread, the first server is further configured to create a second chat session between the first chat party and a third chat party, communication in the second chat session being bi-directional between the first chat party and the third chat party, the second chat session being another sub-chat of the chat thread, the third chat party enabled to passively participate in the first chat session while actively communicating with the first chat party, and the third chat party and second chat session being transparent to the second chat party.

1 Claim, 3 Drawing Sheets

SYSTEM FOR PROVIDING TRANSPARENT PARTICIPATION OF THIRD PARTIES IN INSTANT MESSAGING COMMUNICATION

CROSS REFERENCE TO RELATED APPLICATIONS

This application is a continuation of U.S. Non-Provisional application Ser. No. 11/970,092, filed Jan. 7, 2008, the contents of which are incorporated herein by reference thereto.

BACKGROUND OF THE INVENTION

1. Field of the Invention

This invention relates to a messaging system, and particularly to a system for providing transparent participation of third parties in instant messaging communication.

2. Description of Background

Today, instant messaging (IM) has many applications beyond internal employee conversations. Uses include customer support and other interactions with individuals outside the company. In current implementations, communication is direct and cannot be retracted. Instant messaging across the Internet is a common chat application that allows instantaneous communication between one or more individuals simultaneously by transmitting information quickly and efficiently through one or more networks. Such instantaneous communication is accomplished through the use of a computer, wireless device, or any text-based communication device having a standard chat application provided by an IM provider.

Instant messaging also facilitates quick exchange of information such as Uniform Resource Locations (URLs) or document snippets, which often times can be difficult to communicate via a telephone. Currently, IM communications have been particularly useful in customer support environments. Many companies have enabled their customers to receive live customer support from a support technician using instant messaging. In some instances, support technicians that are providing live support may be in a training phase, which may require a trainer to monitor the communications between the support technician and the customer. However, such monitoring can be difficult when the training actions are for distributed work environments. Another problem that arises is that a distributed workforce "over the shoulder" or "in the same room" education is not possible due to the geographic separation between the trainer and the trainee.

Existing solutions require that a secondary communication network be utilized which increases expenses and may not always be available. Even so, these secondary communication paths do not show the real time aspect of the original communication and they add human delay to the equation.

Existing solutions further require integration with a secondary communication media, which introduces delays into the communication flow. Other solutions have presented themselves where a delay is introduced by having the second chat party approve or monitor the communication. However, this solution is not sufficient when transparent participation is desired, but both the approval step and human delays are not desired.

SUMMARY OF THE INVENTION

The shortcomings of the prior art are overcome and additional advantages are provided through the provision of a method for providing transparent participation of third parties in messaging communication, the method comprising: enabling the creation of a first chat session between a first chat party and a second chat party, communication in the first chat session being bidirectional between the first chat party and the second chat party, the first chat session being a sub-chat of a chat thread; enabling the creation of a second chat session between the first chat party and a third chat party, communication in the second chat session being bidirectional between the first chat party and the third chat party, the second chat session being another sub-chat of the chat thread; enabling the third chat party to passively participate in the first chat session while actively communicating with the first chat party, the third chat party and the second chat session being transparent to the second chat party.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for providing transparent participation of third parties in instant messaging communication.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
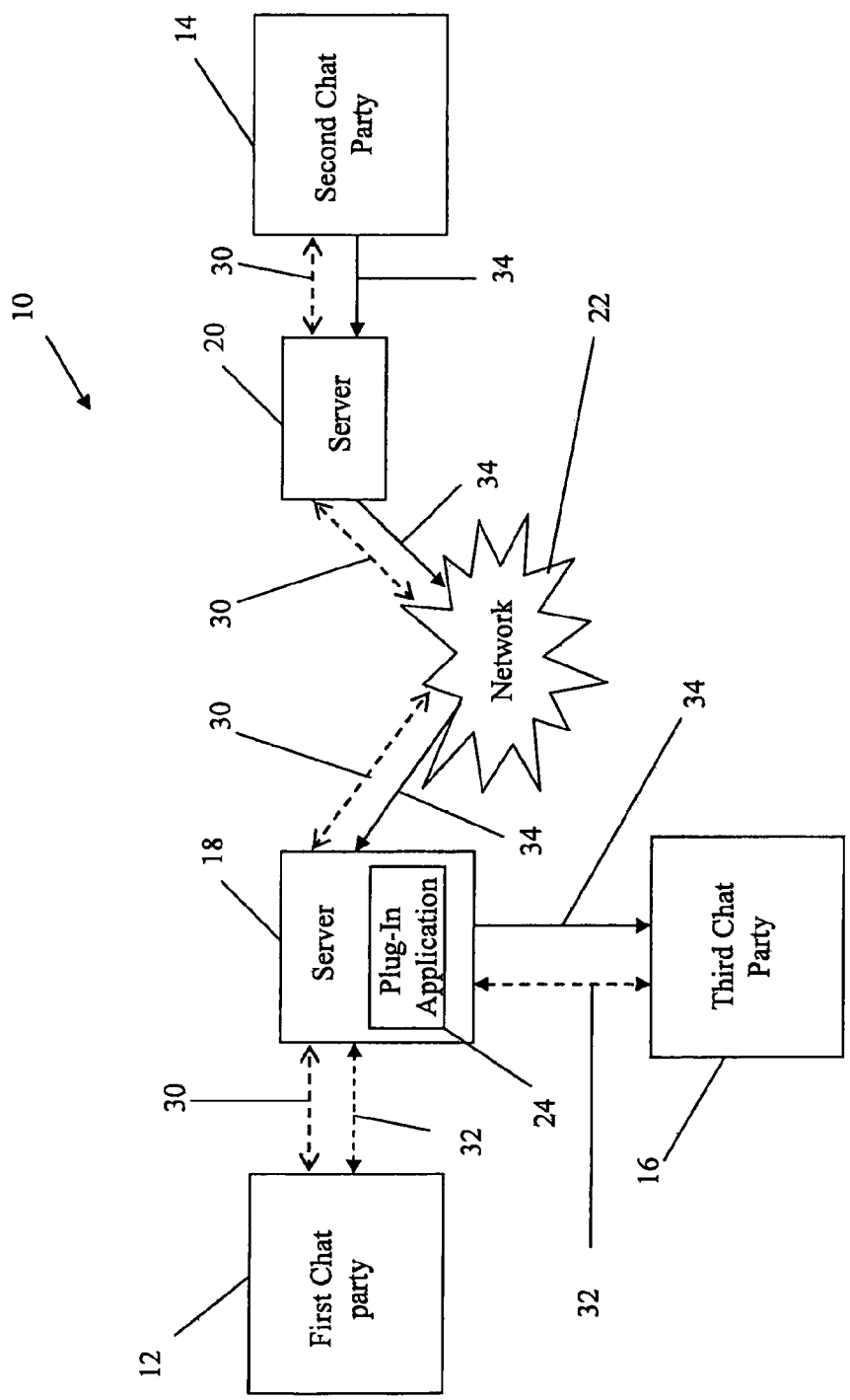
FIG. 1 illustrates a schematic diagram of an instant messaging system in accordance with one exemplary embodiment of the present invention.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompany drawings and detailed in the following description. It should be noted that the features illustrated in the drawings are not necessarily drawn to scale. Descriptions of well-known or conventional components and processing techniques are omitted so as to not necessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Exemplary embodiments of an instant messaging system and a method of using the same in accordance with the present invention will now be described with reference to the drawings. An exemplary embodiment of a method for providing transparent participation of third parties in instant messaging is provided comprising: enabling the creation of a first chat session between a first chat party and a second chat party, communication in the first chat session being bidirectional between the first chat party and the second chat party; enabling the creation of a second chat session between the first chat party and a third chat party, communication in the second chat session being bidirectional between the first chat party and the third chat party; and enabling the third chat party to passively participate in the first chat session while communicating with the first chat party, the third chat party and the second chat session being transparent to the second chat party.

Now referring to the drawings, FIG. 1 illustrates a schematic diagram of an instant messaging system 10 configured for providing transparent participation of third parties in instant messaging. The system includes a first chat party 12, a second chat party 14, a third chat party 16, a first server 18, and a second server 20. In accordance with one embodiment, the first server 18 and the second server are in signal communication via a communications network 22. The system further includes a plug-in application 24 configured for being installed to the first server 18, which will be described in more detail below. In one embodiment, the first chat party 12 communicates with the second chat party through the first server 18 and the second server 20 while the first chat party 12 communicates with the third chat party 16 through the first server 18. The first server 18 is operably associated with the first chat party 12 while the second server 20 is operably associated with the second chat party 14 in accordance with one embodiment. It should be understood that the communications described herein are exchanges of messages through instant messaging.

The first chat party 12, the second chat party 14, and the third chat party 16 each have a means for communicating as described. In one non-limiting embodiment, the means includes a computer system having a display screen and a computer program that, when loaded and executed permits the computer to operate such that it carries out the methods described herein. Another non-limiting exemplary embodiment includes a text-based phone. Of course, other text-based devices may be used in other exemplary embodiments of the present invention.

Computer program means or computer program used in the present context of exemplary embodiments of the present invention include any expression, in any language, code, notation, or the like of a set of instructions intended to cause a system having information processing capabilities to perform a particular function either directly or after conversion to another language, code, notation, or the like, reproduction in a different form.

The first server 18 and second server 20 may be any conventional server configured for supporting the communications between the chat parties. More specifically, the first server 18 and the second server 20 are each configured for supporting instant messaging programs or software packages for providing instant messaging capabilities for each of the chat parties. In one non-limiting embodiment, the first server 18 and the second server 20 are remote servers in signal communication with the computer system operated by each of the chat parties. In another non-limiting exemplary embodiment, the first server 18 is not a remote server, rather an integral part of the computer system of the first chat party 12 configured to be in signal communication with the second server 20, which is also an integral part of the computer system of the second chat party 12 in accordance with one non-limiting exemplary embodiment. It is contemplated that neither the first server 18 or the second server 20 belong to any particular chat party in accordance with other exemplary embodiments; however, allows the chat parties to access the network to allow for transparent participation as described herein.

In accordance with one embodiment, the first server 18 is configured for supporting plug-in software/applications for enabling transparent participation, which will further be described below. It should be understood that the plug-in application used in the context of exemplary embodiments of the present invention is configured for adding, removing, and modifying the functionality of the instant messaging programs or software packages supported by the first server 18.

In accordance with one exemplary embodiment, the first chat party 12 creates a first chat session with the second chat party 14 via the first server 18 and the second server 20. The second chat party 14 can similarly create a first chat session with the first chat party 12. This can be accomplished through conventional IM techniques, such as, for example, having the first chat party 12 transmit or receive a request for a chat session with the second chat party 14 and accepting the same. The first chat session is a simple chat between the first chat party 12 and the second chat party 14 where communications are bidirectional. The bidirectional communications between the first chat party 12 and the second chat party 14 are indicated by arrow 30.

In accordance with one exemplary embodiment, the first chat party 12 also creates a second chat session with the third chat party 16 through the first server 18. This is accomplished through the plug-in application 24 installed on first server 18 as shown in FIG. 1. Consequently, the first server 18 supports both the first chat session and the second chat session. The second chat session is an enhanced chat between the first chat party 12 and the third chat party 16 where communications are bidirectional. The bidirectional communications between the first chat party 12 and the third chat party 16 are indicated by arrow 32.

In accordance with one embodiment, the plug-in application 24 is configured for permitting the third chat party 16 to become a transparent participant to the first chat session between the first chat party 12 and the second chat party 14. In other words, the plug-in application 24 allows the third chat party 16 to transparently participate in the communications between the first chat party 12 and the second chat party 14 and actively communicate with the first chat party 12. As such, the communications in the second chat session between the first chat party 12 and the third chat party 16 are invisible to the second chat party 14. Communications from the first chat session are sent back and forth between the first chat party 12 and the second chat party 14 accordingly in real-time. The same communications from the first chat session are also sent to the third chat party 16 in real-time such that the third chat party 16 can passively participant in the first chat session. Communications from the second chat party 14 are sent to the third chat party 16 via the second server 20 and first server 18 in accordance with one embodiment. The communications from the second chat party 14 to the third chat party 16 are unidirectional. In other words, the third chat party 16 has unidirectional access to communications made by the second chat party 14 to the first chat party 12 and the second chat party 14 is not aware of the existence of the third chat party 16. The unidirectional communications from the second chat party 14 to the third chat party 16 are indicated by arrows 34. In accordance with one embodiment, messages between the first chat party 12 and the second chat party 14 can not be blocked by the third chat party 16. Advantageously, the third chat party 16 can passively participate in the in the first chat session in real-time and the second chat party 14 is able to have real-time conversation with the first chat party 12.

In one exemplary embodiment, the first chat session and the second chat session make up one chat thread where the first chat session and the second chat session are each sub-chats of the chat thread. The parties involved in each chat session take an active role in their sub-chat. However, the third chat party 16 is allowed to take a passive role in the sub-chat between the first chat party 12 and the second chat party 14 as described. In one non-limiting embodiment, the first chat party 12 authorizes the third chat party 16 to take a passive role in the sub-chat between the first chat party 12 and the second chat party 16. As such, the third chat party 16 takes active participation with a sub-chat of the chat participants and is invisible to the second chat party 14. In one exemplary embodiment, the first chat party 12 receives a message from the third chat party 16 and forwards the message to the second chat person without identification of the third chat party 16.

Figure 2:
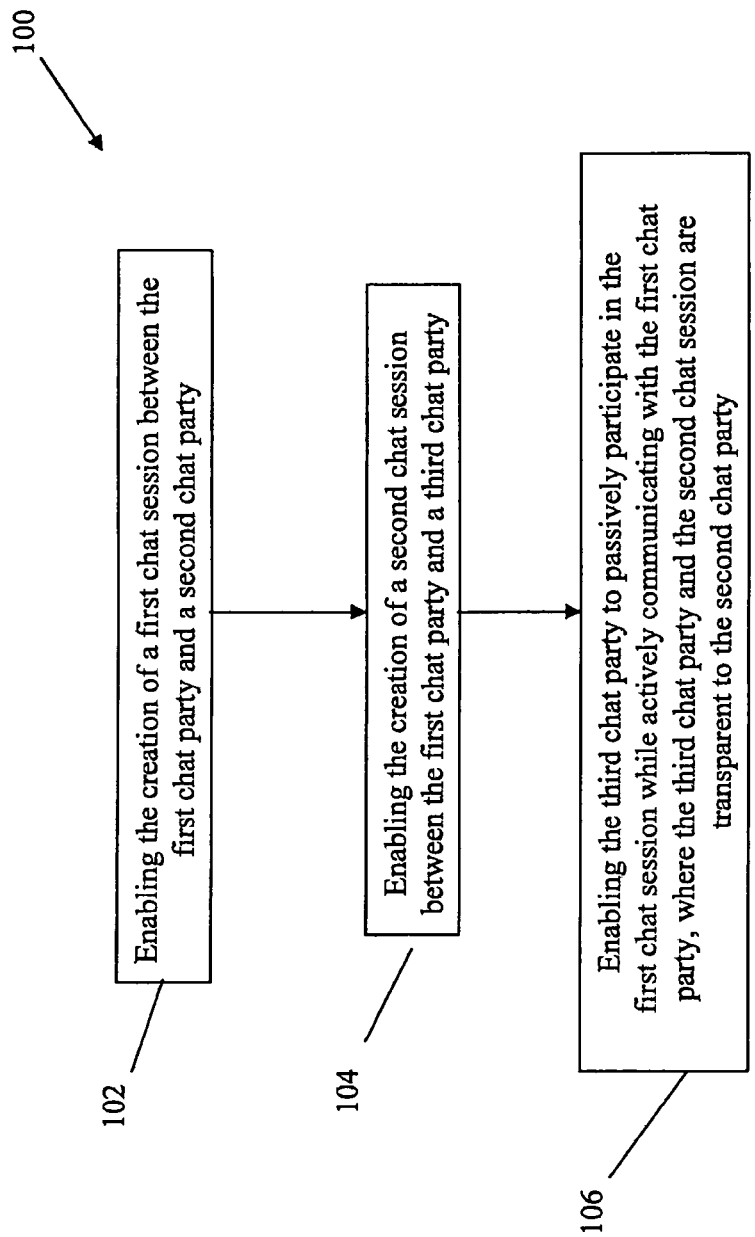
FIG. 2 illustrates a flow diagram of a method for providing transparent participation of third parties in messaging communications using the instant messaging system in accordance with one exemplary embodiment of the present invention.

Referring now to FIG. 2, a flow chart of a method for providing transparent participation of third parties in instant messaging communication in accordance with exemplary embodiments is generally illustrated as 100. The method includes enabling the creation of a first chat session between a first chat party and a second chat party, as shown in method step 102. Communications in the first chat session are bidirectional between the first chat party and the second chat party. The first chat session is a sub-chat of a chat thread in accordance with one exemplary embodiment. As shown in method step 104, the method further includes enabling the creation of a second chat session between first chat party and a third chat party. Communications in the second chat session are bidirectional between the first chat party and the third chat party. The second chat session is another sub-chat of the chat thread in accordance with one exemplary embodiment. The method further includes enabling the third chat party to passively participate in the first chat session while actively communicating with the first chat party, where the third chat party and the second chat session are transparent to the second chat party at method step 106.

In one example, the first chat party 12 (for example, a service representative/trainer) messages the second chat party 14 (for example, a customer) to provide the second chat party 14 customer support via IM. At any point during the chat session between the first chat party 12 and the second chat party 14, the first chat party 16 can message the third chat party 16 (for example, a trainee) to allow the third chat party 16 to transparently participate in the conversation between the first chat party 12 and the second chat party 14 for training purposes. The third chat party 16 and the first chat party 12 can also exchange messages between each other. Neither the third chat party 16 nor the messages being exchanged between the first chat party 12 and the third chat party 16 are visible to the second chat party 14. Optionally, the first chat party 12 can forward a message prepared by the third chat party 16 to the second chat party 14 without identifying the third chat party 16. In another example, the first chat party is the trainee while the third chat party is the trainer. In this way, the trainer can look "over the shoulder" of the trainee without physically being adjacent to the trainee as the trainee is providing customer support to the customer.

Figure 3:
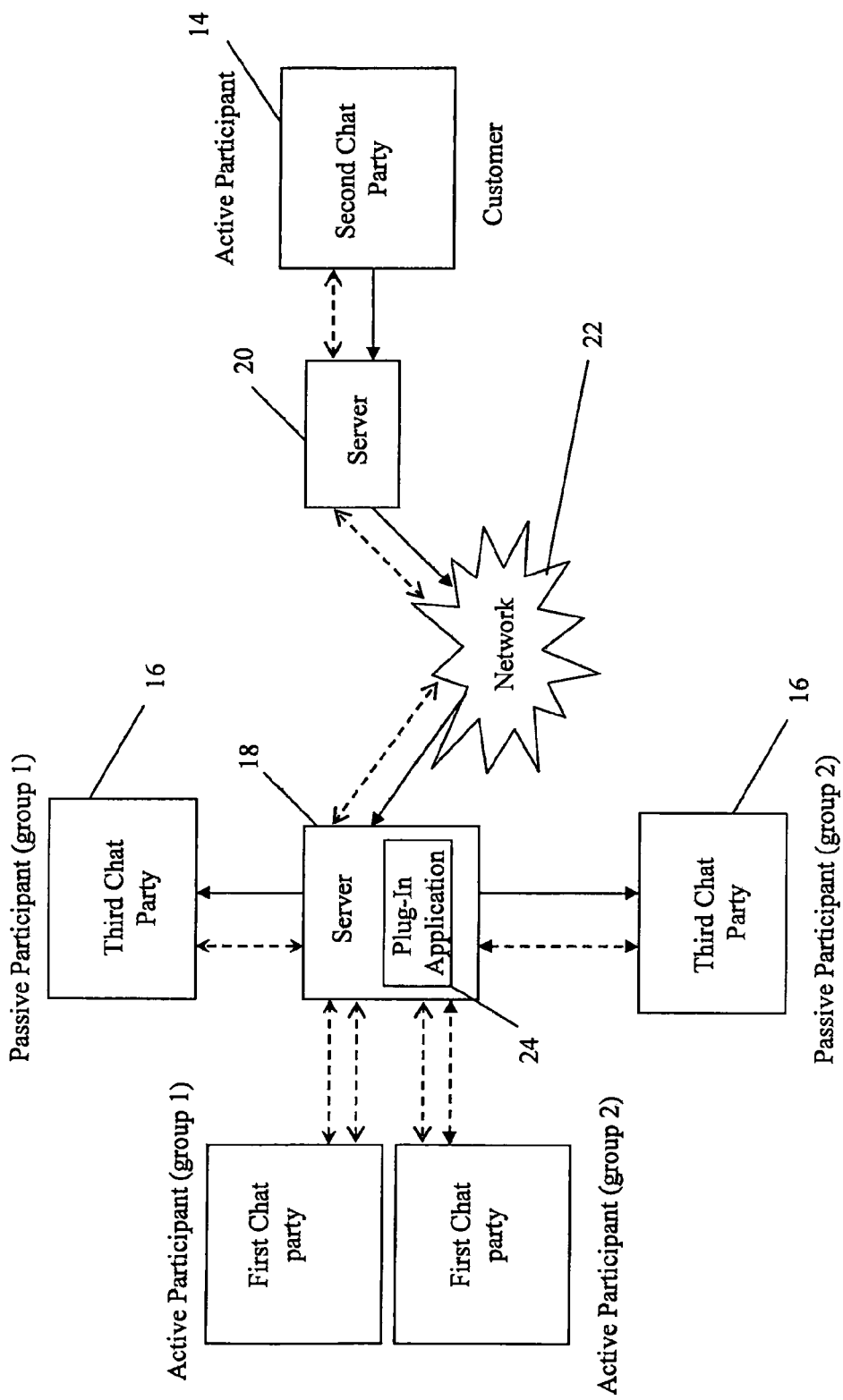
FIG. 3 illustrates a schematic diagram of the instant messaging system having a plurality of active participants and a plurality of passive participants in accordance with one exemplary embodiment of the present invention.

It should be understood that more than one active participant and more than one passive participant can be part of the chat thread. One exemplary configuration of more than one active participant including the customer, which is also an active participant, and more than one passive participant in a chat thread is illustrated in FIG. 3. In accordance with one embodiment, one active participant can invite another active participant to join the chat session with the customer. Each active participant can invite a corresponding passive participant and create a sub-chat with the same along with the customer as described above in accordance with one embodiment. As such, for example, two trainers (active participant) can each create a sub-chat with a respective trainee (passive participant) such that the respective trainee is able to passively participant in the chat session between the respective trainer and the customer or both trainers and the customer. It is contemplated that each passive participant can invite another passive participant to its sub-chat with an active participant, thereby creating a passive group, and allow such passive participant to transparently participant in the chat session between the active participant and the customer. It is further contemplated that each active participant can invite more than one passive participant that is not in the same passive group and create another passive group. In other words, both passive (for example, the trainees) and active participants (for example, the trainers) may invite another person as a passive participant into an existing passive group that the inviter is a member of, and active participants may create any number of passive groups. Of course, other configurations may be formed and should not be limited to the configurations described above.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An instant messaging system for providing transparent participation of third parties in instant messaging, the system comprising:

a first server and a second server configured to create a first chat session between a first chat party and a second chat party, communication in the first chat session being bidirectional between the first chat party and the second chat party, the first chat session being a sub-chat of a chat thread, the first server is further configured to create a second chat session between the first chat party and a third chat party, communication in the second chat session being bi-directional between the first chat party and the third chat party, the second chat session being another sub-chat of the chat thread, the third chat party enabled to passively participate in the first chat session while actively communicating with the first chat party, and the third chat party and second chat session being transparent to the second chat party.

* * * * *